US010630420B2

(12) United States Patent
Heglund et al.

(10) Patent No.: US 10,630,420 B2
(45) Date of Patent: Apr. 21, 2020

(54) HYBRID ENERGY STORAGE MODULES FOR DIRECTED ENERGY SYSTEMS

(71) Applicant: HAMILTON SUNDSTRAND CORPORATION, Charlotte, NC (US)

(72) Inventors: William S. Heglund, Rockford, IL (US); Matthew L. Wilhide, Cherry Valley, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 358 days.

(21) Appl. No.: 15/638,986

(22) Filed: Jun. 30, 2017

(65) Prior Publication Data
US 2019/0006867 A1    Jan. 3, 2019

(51) Int. Cl.
| | |
|---|---|
| *H02J 1/10* | (2006.01) |
| *H04K 3/00* | (2006.01) |
| *H02J 7/14* | (2006.01) |
| *H02J 7/00* | (2006.01) |
| *F41H 13/00* | (2006.01) |

(52) U.S. Cl.
CPC .............. *H04K 3/62* (2013.01); *H02J 7/0068* (2013.01); *H02J 7/1415* (2013.01); *H02J 7/1438* (2013.01); *F41H 13/005* (2013.01); *H02J 2207/20* (2020.01)

(58) Field of Classification Search
CPC ...... H02J 7/0065; H02J 7/0068; H02J 7/1438; H02J 7/1415; F41H 13/005; H04K 3/62
See application file for complete search history.

(56) References Cited

U.S. PATENT DOCUMENTS

| | | | |
|---|---|---|---|
| 6,998,822 B2 | 2/2006 | Turner | |
| 7,701,082 B2 | 4/2010 | Lazarovich | |
| 7,830,686 B2 | 11/2010 | Zeng | |
| 8,890,463 B2 | 11/2014 | Rozman | |
| 8,981,727 B2 | 3/2015 | Kusch et al. | |
| 9,013,066 B2 | 4/2015 | Kojori | |
| 9,197,088 B2 | 11/2015 | Viellard | |
| 9,230,748 B1 | 1/2016 | Semrau | |
| 9,419,522 B1 | 8/2016 | Khaligh | |
| 9,535,480 B2 | 1/2017 | Ye et al. | |
| 2005/0052165 A1 | 3/2005 | Willner | |
| 2007/0182362 A1 | 8/2007 | Trainor | |

(Continued)

OTHER PUBLICATIONS

Wilhide, U.S. Appl. No. 15/230,181, filed Aug. 5, 2016 and entitled "Hybrid Energy Storage Module Arrangements".

(Continued)

*Primary Examiner* — Alfonso Perez Borroto
*Assistant Examiner* — Esayas G Yeshaw
(74) *Attorney, Agent, or Firm* — Snell & Wilmer, L.L.P.

(57) ABSTRACT

An electrical power system for an aircraft may comprise a hybrid energy storage system, a first high voltage bus coupled to an input of said hybrid energy storage system, a second high voltage bus coupled to an output of said hybrid energy storage system, and a directed energy system coupled to the second high voltage bus. The hybrid energy storage system receives DC power via the input from said first high voltage bus, converts the DC power to a converted DC power, and dynamically stores the converted DC power and/or provides said converted DC power via said output to said directed energy system via the second high voltage bus.

17 Claims, 3 Drawing Sheets

(56) References Cited

U.S. PATENT DOCUMENTS

| | | |
|---|---|---|
| 2009/0309416 A1 | 12/2009 | Bose |
| 2011/0011659 A1* | 1/2011 | Sailor .................... B60K 1/04 |
| | | 180/65.245 |
| 2014/0339902 A1 | 11/2014 | Sepe, Jr. |
| 2016/0082844 A1 | 3/2016 | King et al. |
| 2016/0204654 A1 | 7/2016 | Mondal |
| 2016/0214737 A1 | 7/2016 | Radun et al. |
| 2016/0265469 A1 | 9/2016 | Harada |
| 2016/0378085 A1 | 12/2016 | Guo |
| 2017/0057363 A1 | 3/2017 | Huh |
| 2017/0063124 A1 | 3/2017 | Yu et al. |
| 2017/0077739 A1* | 3/2017 | Jouper ................. H04B 5/0037 |
| 2017/0155266 A1* | 6/2017 | Namou ................. H02J 7/0057 |
| 2017/0166081 A1* | 6/2017 | Kwon ............... H01M 8/04303 |

OTHER PUBLICATIONS

Wilhide, U.S. Appl. No. 15/639,209, filed Jun. 30, 2017 and entitled "HESM Fast Recharge Algorithm".

Wilhide, U.S. Appl. No. 15/639,104, filed Jun. 30, 2017 and entitled "HESM High Pluse Power Algorithm".

Wilhide, U.S. Appl. No. 15/639,128, filed Jun. 30, 2017 and entitled "HESM Parallel Response Mode".

USPTO, Pre-Interview First Office Action dated Aug. 21, 2019 in U.S. Appl. No. 15/639,104.

USPTO, Pre-Interview First Office Action dated Aug. 22, 2019 in U.S. Appl. No. 15/639,209.

USPTO, Notice of Allowance dated Sep. 24, 2019 in U.S. Appl. No. 15/639,128.

USPTO, First Action Interview Office Action dated Oct. 31, 2019 in U.S. Appl. No. 15/639,104.

USPTO, First Action Interview Office Action dated Nov. 15, 2019 in U.S. Appl. No. 15/639,209.

Wikipedia contributors. (Apr. 14, 2019). Slew rate. In Wikipedia, The Free Encyclopedia. Retrieved 20:52, Sep. 18, 2019, from https://en.wikipedia.org/w/index.php?title=Slew_rate&oldid=892432254 (Year 2019).

\* cited by examiner

HYBRID ENERGY STORAGE MODULES FOR DIRECTED ENERGY SYSTEMS

FIELD

The present disclosure relates generally to high voltage electrical power systems and more specifically to hybrid energy storage modules for directed energy systems.

BACKGROUND

Military hardware, such as aircraft, land vehicles, and naval vessels, may use high power electrical systems for delivery and storage of energy for Directed Energy Systems (DES). Typically, these high power electrical systems include a dedicated generator for the DES and an energy storage element. With this approach, a significant weight penalty is incurred as the generator, power filter and multiple DC-to-DC converters account for a significant portion of the weight and volume of the total system weight. Additionally, losses in the DC-to-DC converters and the power filter may account for a significant increase in cooling costs.

SUMMARY

An electrical power system for an aircraft is described herein, in accordance with various embodiments. In various embodiments, an electrical power system for an aircraft includes a hybrid energy storage system, a first high voltage bus coupled to an input of the hybrid energy storage system, a second high voltage bus coupled to an output of the hybrid energy storage system, and a directed energy system coupled to the second high voltage bus, wherein the hybrid energy storage system receives DC power via the input from the first high voltage bus, converts the DC power to a converted DC power, and dynamically stores the converted DC power and provides the converted DC power via the output to the directed energy system via the second high voltage bus.

In various embodiments of the electrical power system, the hybrid energy storage system comprises a uni-directional DC-to-DC converter coupled to the first high voltage bus, an energy storage unit, a power filter, and a hybrid control unit coupled to the uni-directional converter and the energy storage unit.

In various embodiments of the electrical power system, the uni-directional DC-to-DC converter converts the DC power to the converted DC power.

In various embodiments of the electrical power system, the uni-directional DC-to-DC converter provides the converted DC power to the energy storage unit of the hybrid energy storage system, the energy storage unit dynamically stores the converted DC power provided from the uni-directional DC-to-DC converter and provides the converted DC power to the directed energy system via the second high voltage bus.

In various embodiments of the electrical power system, the uni-directional DC-to-DC converter dynamically provides the converted DC power to at least one of the directed energy system or the energy storage unit.

In various embodiments of the electrical power system, dynamic capabilities of the hybrid energy storage system are controlled by the hybrid control unit.

In various embodiments of the electrical power system, the hybrid control unit controls the hybrid energy storage system using a voltage regulator.

In various embodiments of the electrical power system, the hybrid control unit controls the hybrid energy storage system based on characteristics of the energy storage unit.

In various embodiments of the electrical power system, the first high voltage bus has a first voltage and the second high voltage bus is a second voltage.

In various embodiments of the electrical power system, the uni-directional converter is electrically isolated from the first high voltage bus.

In various embodiments of the electrical power system, the energy storage unit is at least one of a cell-stacked battery and an ultracapacitor.

In various embodiments of an electrical power system for an aircraft, the electrical power system includes a directed energy system, a primary source coupled to the directed energy system, the primary source including a uni-directional DC-to-DC converter, and a secondary source coupled to the directed energy system, the secondary source including an energy storage unit, wherein based upon a determination of a state of charge of the energy storage unit, the uni-directional DC-to-DC converter of the primary source provides a converted DC power to at least one of the directed energy system or the energy storage unit, or the secondary source provides power to the directed energy system.

In various embodiments, the electrical power system further comprises a hybrid control unit coupled to the aircraft, the aircraft commanding the hybrid control unit to refrain from drawing power from a bus coupled to the uni-directional DC-to-DC converter.

In various embodiments of the electrical power system, the determination is based on at least one of charging characteristics of the energy storage unit.

In various embodiments of the electrical power system, the uni-directional DC-to-DC converter is capable of controlling a magnitude and a slew rate of a first load coupled to a first high voltage bus coupled to the uni-directional DC-to-DC converter.

In various embodiments of the electrical power system, the uni-directional DC-to-DC converter is electrically isolated.

In various embodiments, a method for providing power to a directed energy system of an aircraft includes measuring a voltage in a power filter, determining a state of charge of an energy storage unit coupled to the power filter, determining whether the voltage differs from a first desired value and whether the state of charge differs from a second desired value, and commanding a DC-to-DC converter coupled to the energy storage unit and the power filter to provide power to the energy storage unit based on the determination.

In various embodiments, the method further includes using the power provided to the energy storage unit to power the directed energy system.

In various embodiments, the method further includes measuring a current in a power filter and determining whether the current exceeds a current threshold of the energy storage unit.

In various embodiments of the method, the DC-to-DC converter is a uni-directional DC-to-DC converter.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Figure 1:
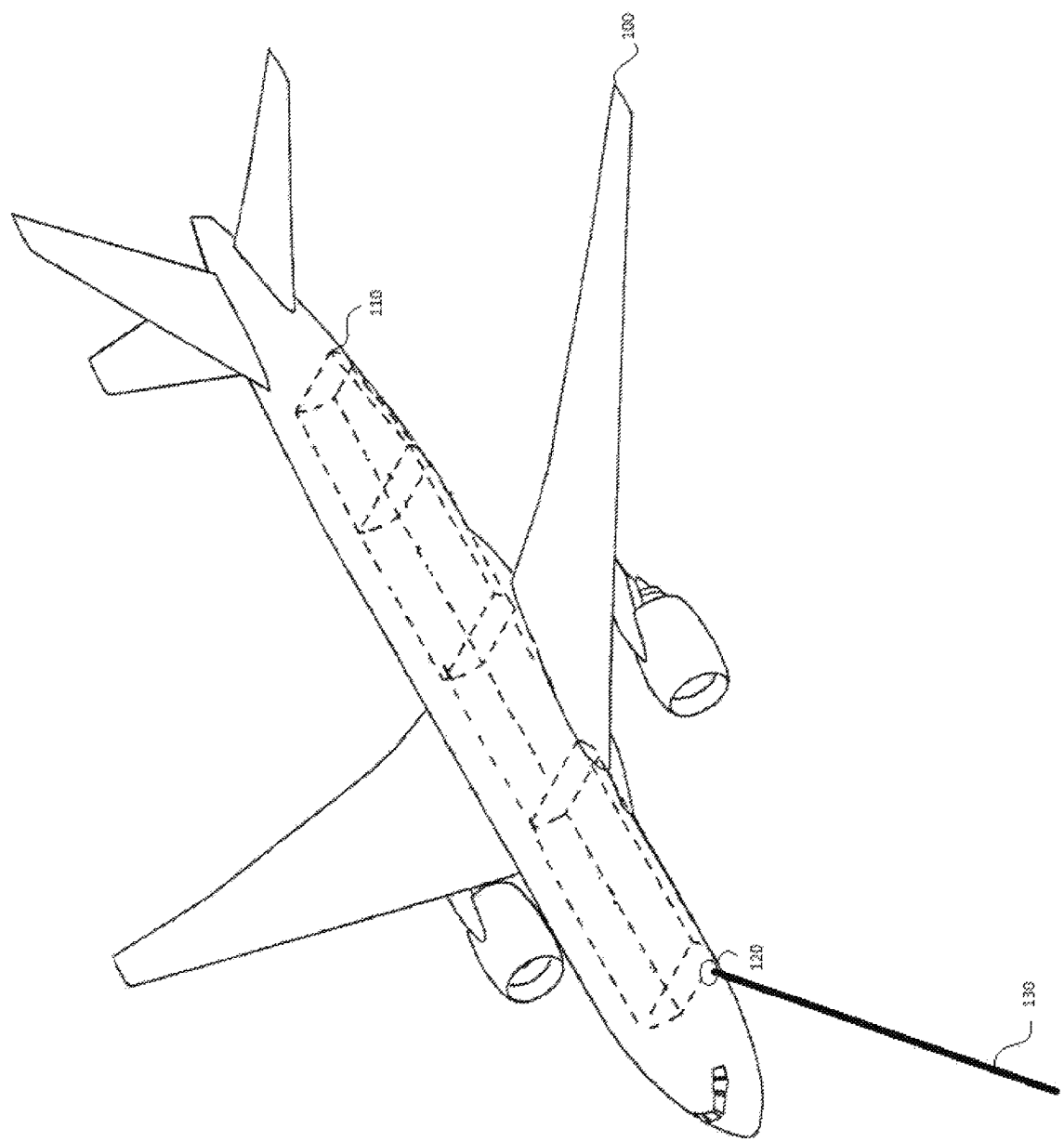
FIG. 1 illustrates an aircraft with an electrical power system, in accordance with various embodiments.

Referring to FIG. 1, an aircraft 100 is shown, in accordance with various embodiments. The present disclosure describes electrical power systems using hybrid energy storage modules with respect to high powered directed energy systems that may be utilized in an aircraft 100. However, it will be understood the systems and methods of the present disclosure may be suitable for use in other systems having directed energy systems. In various embodiments, aircraft 100 includes an electrical power system 110 that provides power to aircraft 100. In various embodiments, electrical power system 110 provides power to a load 120, which may be a directed energy system (DES) capable of producing a laser beam 130. In various embodiments, load 120 may require an electrical power system 110 with hybrid energy storage capabilities that is capable of providing power from a secondary power source and a primary power source which are both capable of providing high voltage power. Electrical power system 110 produces, stores and provides power to load 120 for production of laser beam 130.

Figure 2:
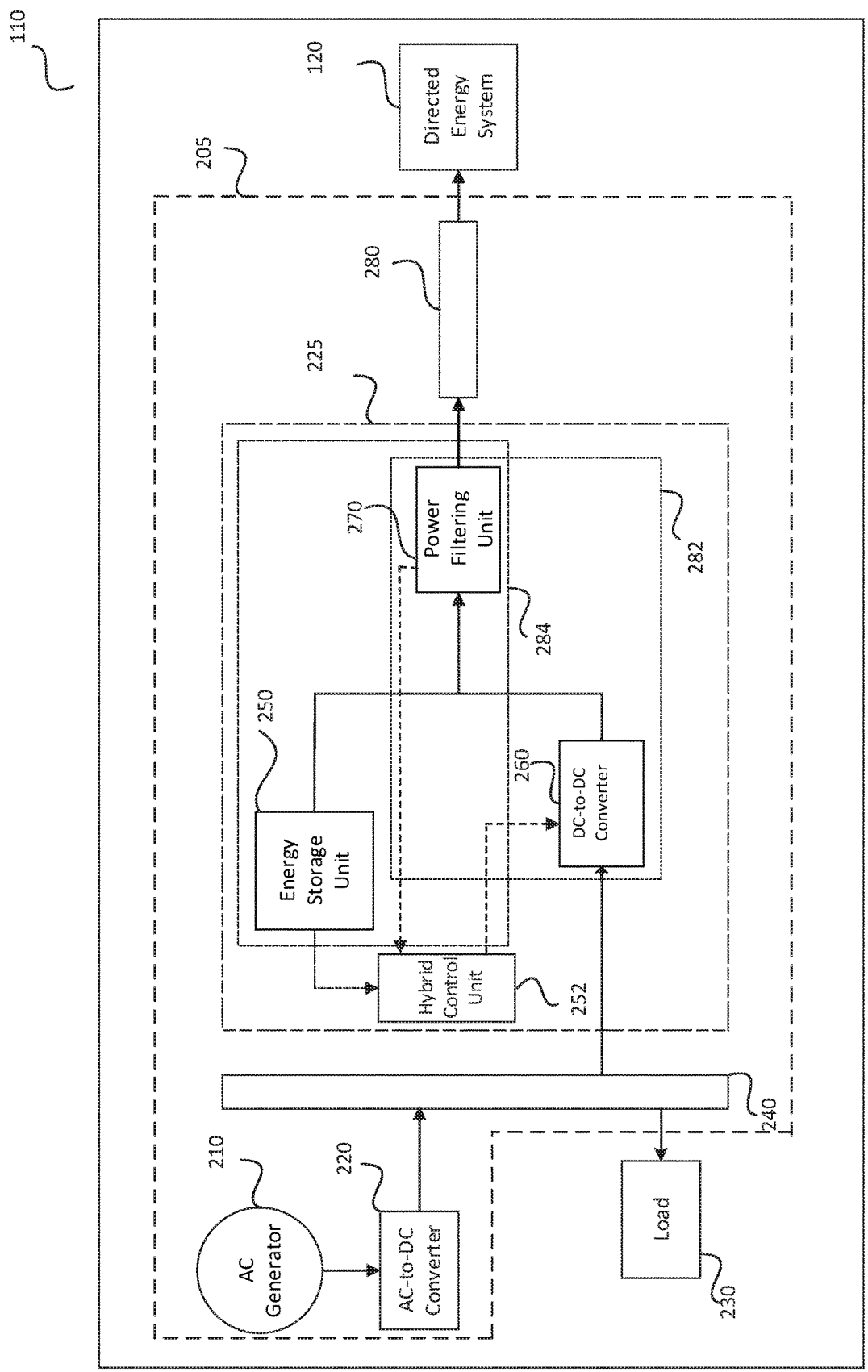
FIG. 2 illustrates a schematic view of an electrical power system with a hybrid energy system, in accordance with various embodiments.

FIG. 2 illustrates a schematic view of an electrical power system 110 according to various embodiments. In various embodiments, electrical power system 110 includes a hybrid energy system 205, a load 230, and a load 120 (also referred to as directed energy system 120). Hybrid energy system 205 may include an AC generator 210, an AC-to-DC converter 220, a bus system 240, a hybrid energy storage module 225, and a bus system 280.

In various embodiments, AC generator 210 may be coupled to AC-to-DC converter 220. AC-to-DC converter 220 may be coupled to bus system 240. Bus system 240 may be coupled to load 230 and hybrid energy storage module 225. Hybrid energy storage module 225 may be coupled to bus system 280. Bus system 280 may be coupled to load 120 (e.g., directed energy system 120).

In various embodiments, hybrid energy storage module 225 may include a hybrid control unit 252, a primary source 282, and a secondary source 284. Primary source 282 may include a DC-to-DC converter 260 and a power filter 270. It may be appreciated that primary source 282 may be coupled to bus system 240, AC-to-DC converter 220, and AC generator 210 to receive DC voltage via bus system 240. Secondary source 284 may include an energy storage unit 250 and power filter 270. In various embodiments, with regards to hybrid energy storage module 225, bus system 240 may be coupled to DC-to-DC converter 260. DC-to-DC converter 260 may be coupled to hybrid control unit 252, energy storage unit 250, and power filter 270. Energy storage unit 250 may be coupled to hybrid control unit 252, DC-to-DC converter 260, and power filter 270. Power filter 270 may be coupled to bus system 280. Bus system 280 may be coupled to load 120.

In various embodiments, for purposes of providing DC power to load 230 and load 120, bus system 240 and bus system 280 may be coupled to load 230 and load 120, respectively. Bus system 240 and bus system 280 may be, for example, high voltage buses capable of providing 270 volts and/or 540 volts to loads 230 and 120, respectively. In various embodiments, other voltages may be used, for example 110 volts, 220 volts, 12 volts, 24 volts, etc. Bus system 240 and bus system 280 may include, for example, conductors such as copper wires located in the hull of aircraft 100. Load 230 may be, for example, communication equipment, navigation equipment, flight instrumentation, and other aircraft electronics. Load 120 may be, for example, a directed energy system designed to emit highly focused energy for various applications. For example, load 120 may be a laser device capable of disseminating highly focused energy to various targets. In various embodiments, load 120 may be, for example, a high powered jamming device used for jamming various communication systems.

In various embodiments, hybrid control unit 252 may control the amount of power or charge provided to energy storage unit 250 and/or the amount of power provided to load 120. In various embodiments, hybrid control unit 252 may control the flow of power by the use of switching devices located inside the DC-to-DC Converter 260. Switching devices may be used to control power flow between the bus system 240 and DC-to-DC converter 260, energy storage unit 250 and DC-to-DC converter 260, and DC-to-DC converter and power filter 270.

In various embodiments, DC-to-DC converter 260 may be the switching device designed to regulate the voltage provided at the output of DC-to-DC converter 260. Power may flow to load 120 from the source (e.g., energy storage unit 250 and/or DC-to-DC converter 260) if sufficient voltage potential exists. In various embodiments, as the load 120 increases, the voltage on high voltage bus 280 may decrease, which in turn may cause power to flow from, for example, energy storage unit 250 (which may be at a higher potential) to load 120. In various embodiments, to charge energy storage unit 250, hybrid control unit 252 may switch DC-to-DC converter 260 such that the output voltage of DC-to-DC converter 260 is greater than the voltage at energy storage unit 250. In various embodiments, the power limit of DC-to-DC converter 260 may prevent the output voltage of DC-to-DC converter 260 from causing damage to hybrid energy storage module 225, and/or elements thereof.

In various embodiments, control of the amount of power provided to energy storage unit 250 and/or load 120 may be based upon signals sent to from energy storage unit 250, DC-to-DC converter 260, and/or load 120 to hybrid control unit 252. In various embodiments, control of the power provided by DC-to-DC converter 260 may be based on the information provided by energy storage unit 250. In various embodiments, the charging of energy storage unit 250 may be based on at least one of a plurality of characteristics or properties of energy storage unit 250, load 120, and/or hybrid energy system 205. For example, in various embodiments, energy storage unit 250 may be charged at a rate slower than the discharge rate of energy storage unit 250. In various embodiments, energy storage unit 250 may be charged at a rate faster than the discharge rate of energy storage unit 250. In various embodiments, DC-to-DC converter 260 may tailor the power provided to the energy storage unit 250 to the desired charging characteristics of the high voltage battery. In various embodiments, based on the altitude of aircraft 100, hybrid control unit 252 may disable the DC-to-DC converter 260, thus allowing load 120 to extract power explicitly from energy storage unit 250. In various embodiments, hybrid control unit 252 may prevent power from being extracted from bus system 240, preventing power from flowing from bus system 240 to DC-to-DC converter 260 or energy storage unit 250.

In various embodiments, during operation of electrical power system 110, AC generator 210 provides alternating current to AC-to-DC converter 220. AC-to-DC converter 220 converts the alternating current to direct current and provides DC, via bus system 240, to load 230 and/or DC-to-DC converter 260 of hybrid energy storage module 225. Bus system 240 may be, for example, a high voltage bus employing 270 volts or other high voltage values necessary to operate the electrical requirements of aircraft 100. The DC provided to load 230 may be, for example, used for typical aircraft applications requiring electrical power (e.g., communication equipment, navigation equipment, etc.).

In various embodiments, DC-to-DC converter 260 receives DC power from bus system 240. In various embodiments, DC-to-DC converter 260 is a uni-directional DC-to-DC converter that provides power in a single direction to energy storage unit 250, power filter 270, and/or load 120. When DC-to-DC converter 260 receives direct current from bus system 240, DC-to-DC converter 260 converts the input voltage received from bus system 240 from a first voltage level to a second voltage level. For example, DC-to-DC converter 260 may convert 270 volts to 540 volts. DC-to-DC converter 260 then provides DC voltage to energy storage unit 250 and/or power filter 270 for use by load 120. Power filter 270 provides the filtered DC voltage to bus system 280 for use by directed energy system 120. In various embodiments, power filter 270 may be optional and DC-to-DC converter 260 may provide voltage directly to high voltage bus 280 and/or directed energy system 120. In various embodiments, power filter 270 conditions the power provided by DC-to-DC converter 260 for use by load 120.

Figure 3:
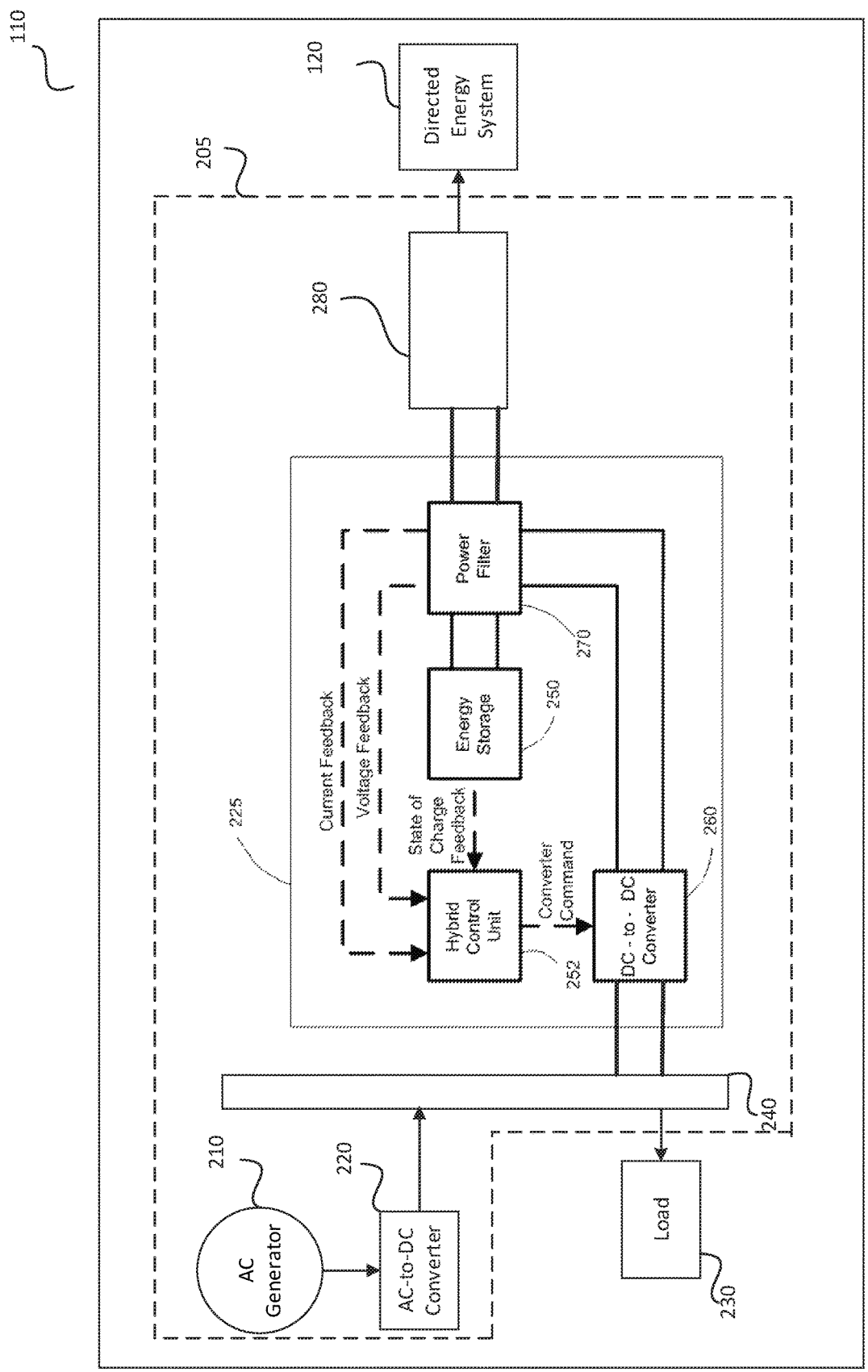
FIG. 3 illustrates a schematic view of an electrical power system with a hybrid energy system, in accordance with various embodiments.

With reference to FIG. 2 and FIG. 3, operation of hybrid energy storage module 225 as a power sourcing and/or charge sourcing unit may be based on command information provided by aircraft 100 to hybrid control unit 252. In various embodiments, based on power needs of aircraft 100 and/or directed energy system 120, hybrid control unit 252 may determine that the hybrid energy storage module 225 is in a power sourcing mode. In various embodiments, hybrid control unit 252 may make a determination as to whether to draw power from bus 240. For example, aircraft 100 may command hybrid control unit 252 to stop drawing power from bus 240 due to the power being needed by other aircraft systems. As such, the power sourced to DES 120 may be provided by secondary source 284 as long as there is charge in the battery.

In various embodiments, hybrid control unit 252 may determine that primary source 282 may be used to power directed energy system 120. Such a determination may be made by, for example, energy storage unit 250 not having enough power to sustain the directed energy requirements of directed energy system 120. In various embodiments, hybrid control unit 252 may determine that hybrid energy storage module 225 is in a charging mode. In various embodiments, during the charging mode, DC-to-DC converter 260 provides power to energy storage unit 250. The amount of power provided to energy storage unit 250 may be based on, for example, the energy reserves of energy storage unit 250. For example, energy levels of energy storage unit 250 have diminished, and DC-to-DC converter 260 may charge energy storage unit 250 to maximum capacity. In response to energy storage unit 250 being sufficiently charged, hybrid control unit 252 may switch to or continue in power sourcing mode, providing power to directed energy system 120. In various embodiments, hybrid control unit 252 may determine that hybrid energy storage module 225 is in both a power sourcing mode of directed energy system 120 and a charging mode of energy storage unit 250. For example, hybrid control unit 252 may direct DC-to-DC converter 260 to provide power to both the energy storage unit 250 and directed energy system 120 simultaneously.

In various embodiments, during operation of hybrid energy storage module 225, load 120 is activated for high voltage use. When load 120 is initially activated, load 120 draws power from energy storage unit 250. The drawing of power from energy storage unit 250 decreases the state of charge of energy storage unit 250 and decreases the voltage of the high voltage bus 280. When the voltage of high voltage bus 280 is below a certain command, hybrid control unit 252 enables DC-to-DC converter 260 for power transfer. When DC-to-DC converter 260 is enabled, DC-to-DC converter 260 transfers power through a path of least resistance to, for example, load 120 or energy storage unit 250. For example, when the DC-to-DC converter 260 is enabled and the load 120 is enabled, power will transfer to load 120 via high voltage bus 280. When the load 120 is disabled (DES stops firing), the power will then flow to energy storage unit 250. When the DC-to-DC converter 260 transfers power to energy storage unit 250, this increases the state of charge in energy storage unit 250. This process may continue until, for example, high voltage bus 280 has recovered to command and/or attained a certain threshold voltage, which may be, for example, 540 volts.

In various embodiments, the voltage of high voltage bus 280 may be set by the voltage of energy storage unit 250. Thus, the operation of hybrid energy storage module 225 may be, for example, based on regulating the bus voltage of the high voltage bus 280 using a voltage control loop.

In various embodiments, energy storage unit 250 may be designed such that with a nominal state of charge of energy storage unit 250 (e.g., 70%), performance over the life of aircraft 100 is met. Thus, based on the age of energy storage unit 250, the nominal state of charge for energy storage unit 250 may vary and/or be a specified amount. For example, a new battery might have a 70% nominal state of charge, but an old battery might have an 85% nominal state of charge.

With reference to FIG. 3, power may be provided to directed energy system 120 of aircraft 100 by, for example, measuring a voltage feedback and/or current feedback at power filter 270. Determining, at hybrid control unit 252, a state of charge of energy storage unit 250 coupled to power filter 270. Determining, at hybrid control unit 252, whether the voltage feedback differs from a first desired value. Determining, at hybrid control unit 252, whether the state of charge differs from a second desired value. The first value may be, for example, a bus voltage with a typical value of either 270 volts or 540 volts DC. The second desired value may be, for example, the state of charge of energy storage unit 250 with a typical value of 70%. Commanding, at hybrid control unit 252, DC-to-DC converter 260, which may be coupled to energy storage unit 250 and power filter 270, to provide power to energy storage unit 250 based on the determinations made at hybrid control unit 252. Using the power provided to energy storage unit 250 to power directed energy system 120. In various embodiments, a current feedback may be measured at power filter 270. A determination may be made at hybrid control unit 252 as to whether the current exceeds a current threshold of the energy storage unit 250. In various embodiments, DC-to-DC converter 260 may be a uni-directional DC-to-DC converter.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical power system for an aircraft, said electrical power system comprising:
   a hybrid energy storage system;
   a first high voltage bus coupled to an input of said hybrid energy storage system;
   a second high voltage bus coupled to an output of said hybrid energy storage system; and
   a directed energy system coupled to said second high voltage bus, wherein said hybrid energy storage system receives DC power via said input from said first high voltage bus, converts said DC power to a converted DC power, and dynamically stores said converted DC power and provides said converted DC power via said output to said directed energy system via said second high voltage bus,
   wherein said hybrid energy storage system comprises a uni-directional DC-to-DC converter coupled to said first high voltage bus, an energy storage unit, a power filter, and a hybrid control unit coupled to said uni-directional DC-to-DC converter and said energy storage unit, and
   wherein said uni-directional DC-to-DC converter is capable of controlling a magnitude and a slew rate of a first load coupled to said first high voltage bus coupled to said uni-directional DC-to-DC converter.

2. The electrical power system of claim 1, wherein said uni-directional DC-to-DC converter converts said DC power to said converted DC power.

3. The electrical power system of claim 2, wherein said uni-directional DC-to-DC converter provides said converted DC power to said energy storage unit of said hybrid energy storage system, said energy storage unit dynamically stores said converted DC power provided from said uni-directional DC-to-DC converter and provides said converted DC power to said directed energy system via said second high voltage bus.

4. The electrical power system of claim 2, wherein said uni-directional DC-to-DC converter dynamically provides said converted DC power to at least one of said directed energy system or said energy storage unit.

5. The electrical power system of claim 1, wherein dynamic capabilities of said hybrid energy storage system are controlled by said hybrid control unit.

6. The electrical power system of claim 5, wherein said hybrid control unit controls said hybrid energy storage system using a voltage regulator.

7. The electrical power system of claim 5, wherein said hybrid control unit controls said hybrid energy storage system based on characteristics of said energy storage unit.

8. The electrical power system of claim 1, wherein said first high voltage bus has a first voltage and said second high voltage bus is a second voltage.

9. The electrical power system of claim 1, wherein said uni-directional DC-to-DC converter is electrically isolated from said first high voltage bus.

10. The electrical power system of claim 1, wherein said energy storage unit is at least one of a cell-stacked battery and an ultracapacitor.

11. An electrical power system for an aircraft, said electrical power system comprising:
- a directed energy system;
- a primary source coupled to said directed energy system, said primary source including a uni-directional DC-to-DC converter; and
- a secondary source coupled to said directed energy system, said secondary source including an energy storage unit, wherein based upon a determination of a state of charge of said energy storage unit, said uni-directional DC-to-DC converter of said primary source provides a converted DC power to at least one of said directed energy system or said energy storage unit, or said secondary source provides power to said directed energy system,
- wherein said uni-directional DC-to-DC converter is capable of controlling a magnitude and a slew rate of a first load coupled to a first high voltage bus coupled to said uni-directional DC-to-DC converter.

12. The electrical power system of claim 11, further comprising a hybrid control unit coupled to said aircraft, said aircraft commanding said hybrid control unit to refrain from drawing power from a bus coupled to said uni-directional DC-to-DC converter.

13. The electrical power system of claim 11, wherein said determination is based on at least one of charging characteristics of said energy storage unit.

14. The electrical power system of claim 11, wherein said uni-directional DC-to-DC converter is electrically isolated.

15. A method for providing power to a directed energy system of an aircraft comprising:
- measuring a voltage in a power filter;
- determining a state of charge of an energy storage unit coupled to said power filter;
- determining whether said voltage differs from a first desired value and whether said state of charge differs from a second desired value;
- commanding a DC-to-DC converter coupled to said energy storage unit and said power filter to provide power to said energy storage unit based on said determination; and
- measuring a current in said power filter and determining whether said current exceeds a current threshold of said energy storage unit.

16. The method of claim 15 further comprising using said power provided to said energy storage unit to power said directed energy system.

17. The method of claim 15 wherein said DC-to-DC converter is a uni-directional DC-to-DC converter.

* * * * *

UNITED STATES PATENT AND TRADEMARK OFFICE
CERTIFICATE OF CORRECTION

PATENT NO. : 10,630,420 B2  
APPLICATION NO. : 15/638986  
DATED : April 21, 2020  
INVENTOR(S) : William S. Heglund et al.

It is certified that error appears in the above-identified patent and that said Letters Patent is hereby corrected as shown below:

On the Title Page

Item (73) for the Assignee field: after HAMILTON, please delete "SUNSTRAND" and insert --SUNDSTRAND--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*